(12) United States Patent
Ritter et al.

(10) Patent No.: US 6,880,761 B1
(45) Date of Patent: Apr. 19, 2005

(54) METHOD FOR LOADING DATA ONTO CHIP CARDS AND DEVICES ADAPTED THERETO

(75) Inventors: Rudolf Ritter, Zollikofen (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/647,461

(22) PCT Filed: Mar. 30, 1999

(86) PCT No.: PCT/CH99/00131

§ 371 (c)(1),
(2), (4) Date: Sep. 29, 2000

(87) PCT Pub. No.: WO99/52066

PCT Pub. Date: Oct. 14, 1999

(30) Foreign Application Priority Data

Apr. 2, 1998 (CH) .................................... 0789/98

(51) Int. Cl.[7] .............................................. G06K 19/06
(52) U.S. Cl. ...................... 235/492; 235/379; 235/375; 235/451; 235/487; 379/55.1; 379/46.1
(58) Field of Search ................................ 235/492, 379, 235/375, 451, 487; 379/55.1, 46.1, 56.1

(56) References Cited

U.S. PATENT DOCUMENTS

| | | | | |
|---|---|---|---|---|
| 5,446,783 A | * | 8/1995 | May ............................ | 455/557 |
| 5,553,314 A | * | 9/1996 | Grube et al. ................. | 455/514 |
| 5,636,264 A | * | 6/1997 | Sulavuori et al. ........... | 359/113 |
| 5,664,157 A | * | 9/1997 | Takahira et al. ............. | 235/380 |
| 5,884,103 A | * | 3/1999 | Terho et al. .................. | 710/72 |
| 5,894,425 A | * | 4/1999 | Saliba .......................... | 710/62 |
| 5,907,418 A | * | 5/1999 | Walczak et al. ............. | 398/106 |
| 5,915,016 A | * | 6/1999 | Savalle et al. ............... | 235/441 |
| 6,119,014 A | * | 9/2000 | Alperovich et al. ........ | 340/7.39 |
| 6,142,369 A | * | 11/2000 | Jonstromer .................. | 235/379 |
| 6,250,557 B1 | * | 6/2001 | Forslund et al. ............ | 235/492 |
| 6,647,257 B1 | * | 11/2003 | Owensby .................... | 455/414.1 |

FOREIGN PATENT DOCUMENTS

| | | |
|---|---|---|
| DE | 196 11 072 | 9/1997 |
| WO | WO 91/16718 | 10/1991 |
| WO | WO 95/33246 | 12/1995 |
| WO | WO 96/33814 | 12/1996 |
| WO | WO 96 38814 | 12/1996 |
| WO | WO 97 04609 | 2/1997 |
| WO | WO 97/04609 | 2/1997 |
| WO | WO 98/58509 | 12/1998 |

* cited by examiner

*Primary Examiner*—Steven S. Paik
(74) *Attorney, Agent, or Firm*—Pillsbury Winthrop LLP

(57) ABSTRACT

A method for loading data on chip cards (2) wherein data from a service center (6) are transmitted over a mobile network (4) to a SIM card (1), which is inserted in a mobile device (3) and connected thereto via an interface with contacts, and are stored there, and wherein such stored data are transmitted contactlessly from the SIM card (1) to a chip card with contacts (2). The mobile device (3) may, for example, be a mobile radio telephone and the mobile network (4) a GSM or UMTS network. The transmissions are preferably secured and authenticated.

21 Claims, 1 Drawing Sheet

METHOD FOR LOADING DATA ONTO CHIP CARDS AND DEVICES ADAPTED THERETO

This application is a 371 of PCT/CH99/00131 filed Mar. 30, 1999.

BACKGROUND

1. Field of the Invention

The present invention relates to a method for loading data on chip cards and to devices adapted therefor.

2. Description of the Related Art

Present-day chip cards (smart cards) make possible the secure storage and processing of data. Through their structure having a monochip embedded in a substrate, they may be considered secure. Chip cards are utilized in various branches of industry for various functions, e.g. as SIM cards for identifying network subscribers, for instance SIM cards in a GSM network for identifying GSM subscribers, as cards having a debit function, e.g. for making telephone calls or getting gasoline, as cards having the function of electronic wallets which can be reloaded with sums of money, or as credential-cards for entrance or admission checks. Although all these solutions are proprietary, and no manufacturer-overlapping implementations are available, the technology and standardization work has currently progressed to the point where it is possible to expand the chip card in such a way that it may be considered an open, manufacturer-neutral platform. It is also conceivable to load one or more dedicated applications on the card, simultaneously or at different times, which can especially also intercommunicate. In addition, it is also possible to produce simultaneously chip cards having standardized interfaces with contacts and having contactless interfaces. Although such flexibility of interfaces and loadable applications is foreseeable, there is still a lack of flexibility as regards the loading of respective program applications and data, particularly data corresponding to sums of money.

Described in the patent applications WO96/38814 and DE 196 11 072 A1 are chip cards that have both contact and contactless interfaces.

Described in the patent application WO 97/04609 is a system for carrying out bank transactions between two chip cards, both of which comprise an account set up on the card and both of which are able to be inserted into a telephone; the telephone can be either a telephone installed in a fixed way or a mobile telephone. According to WO 97/04609, in addition to the card reader module which is used to receive the SIM card (Subscriber Identification Module), the mobile telephones each further comprise a further card reader module in which the chip cards with the accounts can be inserted. In another variant embodiment of WO 97/04609, the chip cards with the accounts and the SIM cards are combined, which means the accounts are implemented on the SIM cards in each case. For carrying out a payment transaction between the accounts on the chip cards (respectively on the SIM cards), according to WO 97/04609, a telephone connection is made by the payer with his telephone, for example via a mobile radio network, to the telephone of the payment recipient. The monetary amount for the transaction is entered by the payer into his telephone, is debited locally against the account on his chip card, is transmitted via the telephone network to the telephone of the payment recipient, and is credited there to the respective account on the chip card of the payment recipient.

BRIEF SUMMARY

It is an object of this invention to propose a new and improved method of loading data on chip cards and devices adapted therefor, making it possible for chip cards to be flexibly loaded with program applications and data, particularly data corresponding to sums of money.

According to the present invention, these goals are achieved particularly by means of the elements of the characterizing clauses of the independent claims. Further advantageous embodiments follow moreover from the dependent claims and the specification.

In particular, these goals are achieved by the invention in that data from a service center are transmitted over a mobile network to a SIM card, which is inserted in a mobile device and connected thereto via an interface with contacts, and are stored there, and that these stored data are transmitted contactlessly from the SIM card to a chip card with contacts. For example, the mobile device is a mobile radio telephone, and the mobile network is a GSM or UMTS network. Preferably, such transmissions take place secured and authenticated.

In a variant, the contactless transmission to the chip card takes place by means of an inductive interface integrated in the mobile device, in which connection it may be advantageous if the chip card, too, can transmit data to this mobile device contactlessly.

In another variant, the contactless transmission to the chip card takes place by means of an inductive interface integrated in the SIM card, in which is connection it may be advantageous if the chip card, too, can transmit data to the SIM card contactlessly.

In different variants, transmission of the data from the service center to the SIM card can be initiated by a user by means of input means of the mobile device or by the service center.

It is advantageous if the contactless transmission of data to the chip card can be initiated by a user by means of input means of the mobile device.

In a variant, the chip card is a value card, and the data correspond to a sum of money.

According to the present invention, the chip card, which has at least one contactless interface, e.g. an inductive interface, as well as an interface with contacts, comprises programmed means for receiving and storing data via the contactless interface of a SIM card which is inserted in a mobile device and is connected thereto via an interface with contacts.

The chip card preferably comprises programmed means for transmitting data via the contactless interface and/or interface with contacts to a peripheral in order to make possible secured and authenticated data transmission by means of the aforementioned SIM card and, in case some of these data are program applications, in order to install these program applications.

Advantageously, the chip card also comprises additional means for transmitting data via the contactless interface to the SIM card and for receiving and storing data from a peripheral via the contactless interface and/or interface with contacts.

Transmission preferably takes place when the chip card is powered by the mobile device, e.g. by means of induction.

According to the present invention, the SIM card, which is inserted in a mobile device and can be connected thereto via an interface with contacts, comprises programmed means for transmitting data via a contactless interface to a chip card, this contactless interface being integrated, e.g. as an inductive interface, in the mobile device or on the SIM card in different variants.

Preferably, the SIM card comprises programmed means for receiving and storing data over a mobile network via the mentioned interface with contacts from a mobile device, e.g. a mobile radio telephone.

The SIM card advantageously also comprises additional programmed means for receiving data from the chip card via the contactless interface.

In a variant, the SIM card comprises additional programmed means for also carrying out the abovementioned functions of the chip card, whereby it can be utilized as a universal SIM and chip card.

BRIEF DESCRIPTION OF THE DRAWINGS

An embodiment of the present invention is described below with the aid of an example. The example of the embodiment is illustrated by means of the sole accompanying drawing:

The single drawing FIGURE is a block diagram showing a mobile network and service center connected thereto and a connected mobile device in which a SIM card is inserted, as well as a chip card and a peripheral.

DETAILED DESCRIPTION

Figure 1:
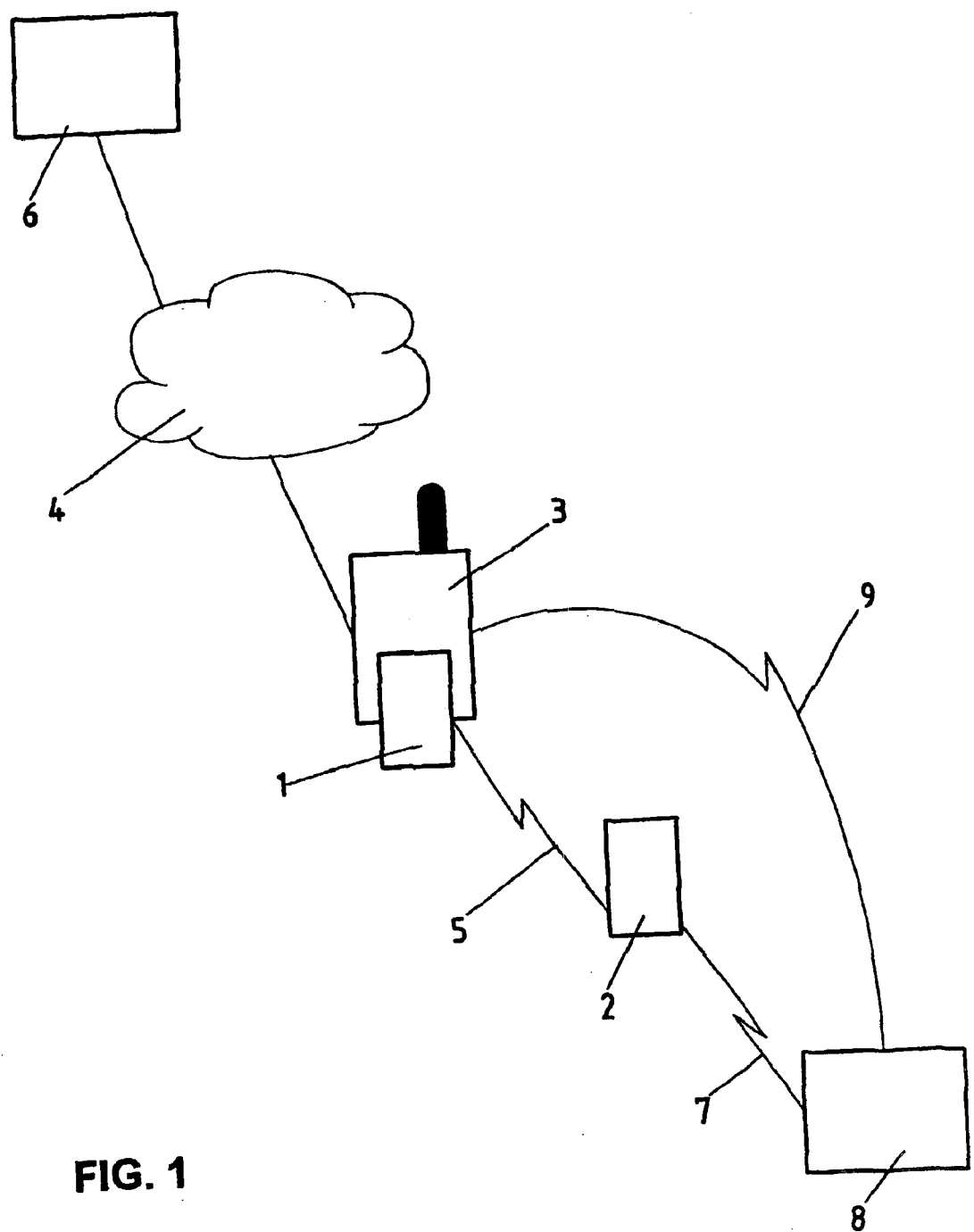

A SIM card 1 is inserted in a mobile device 3, e.g. a mobile radio telephone, and connected thereto via an interface with contacts. The SIM card has programmed means for receiving data from a service center 6 over a mobile network 4, e.g. a GSM or UMTS network, and for storing these data in the memory on the SIM card 1. This program may, for example, be designed in such a way that the data are transmitted by means of special short messages, e.g. in SMS short messages or in USSD data, e.g. according to the SICAP method described in European Patent No. 689,368, among other things, or according to a similar method. In a variant, this transmission may be initiated by a user via the input means (not shown) of the mobile device 3 in that the programmed means of the mobile device 3 accept respective commands and information via such input means. In another variant, this transmission of data is initiated by the service center 6, e.g. after the user has filed a respective order in writing or by telephone with the operator of the service center 6, e.g. a bank or a software service center, or after he has made a respective remittance.

Transmission of the data between the service center 6 and the mobile device 3, i.e. the SIM card 1, takes place with the aid of security services, e.g. by means of a TTP (Trusted Third Party) or other suitable method in order to guarantee the confidentiality, authenticity, indisputableness of origin, and integrity of the data, and above all also the authenticity of the respective sender, i.e. of the user and/or the service center 6.

The data transmitted and stored on the SIM card 1 may, in a further step, be transmitted via a contactless interface 5 to a chip card 2 through the programmed means on the SIM card 1. In different variants, the contactless interface may be integrated on the SIM card 1 or in the mobile device 3, e.g. as an inductive interface. Correspondingly, the chip card 2 likewise has a contactless interface and the respective programmed means for receiving and storing the data from the SIM card 1 via this contactless interface. Chip cards having contactless interfaces are described, for example, in International Patent Application Publications Nos. WO 91/16718 and WO 95/33246, or in the as yet unpublished International Patent Application PCT/CH97/00237. In a similar manner as described above, such transmission may likewise be initiated by the user via the input means of the mobile device 3. Also in a similar manner as described above, transmission of the data between the SIM card 1 and the chip card 2 additionally takes place with the aid of security services.

Depending upon the kind of data, it may furthermore be advantageous for only some of the data or data values dependent upon these data to be transmitted. For instance, the data transmission may correspond to sums of money now stored on the SIM card 1 which may be transmitted to the chip card 2 as one whole sum or in partial sums selected by the user via the input means of the mobile device 3. The chip card 2 may then be used, as will be described below, as a means of payment, for example, or as a supplier of other data, or newly loaded program applications can be run. In the event of the last example, the chip card 2 further has suitable programmed means for installing and administering such program applications. It is also quite possible, however, that sums of money and/or other data may be transferred directly to a peripheral 8 by means of the contactless interface 9 integrated on the mobile device 3 or in the SIM card 1 and the respectively expanded programmed means on the SIM card 1, e.g. for paying at a suitably equipped cashier's desk in a shop.

The chip card 2 may, for instance, be a value card, e.g. a credit card, a debit card, or an electronic wallet card, which can remit secure payments via an interface with contacts to a peripheral (not shown), e.g. a vending machine, a petrol pump, or a pay telephone. The data transmission from the chip card 2 to a peripheral, e.g. the previously described monetary transaction, can naturally also be carried out from the chip card 2 via its contactless interface 7, e.g. an inductive interface, to a peripheral 8 having a suitable contactless interface. In this latter case, it is advantageous if the transmission takes place when the chip card 2 is powered, e.g. by means of induction, by the peripheral 8. For carrying out these functions and services and, for example, also for receiving data from peripherals via contact or contactless interfaces and storing them on the chip card 2, the chip card 2 comprises the respective programmed means which also make it possible for data transmissions similar to those described above to be carried out with the aid of security services.

The chip card 2 advantageously further has suitable means for transmitting data via the contactless interface to the mobile device 3, i.e. to the SIM card 1. Transmission preferably takes place when the chip card is powered, e.g. by means of induction, by the mobile device 3. This might also be used, among other things, e.g. for displaying information relating to the chip card 2 on the display (not shown) of the mobile device 3. In case the chip card 2 is a value card, the balance on the chip card 2 and/or the name of the bank or credited company responsible for the value card may be displayed, for instance. Likewise, other data, e.g. sums of money, may also be transmitted from the peripheral 8 to the chip card 2 and from the latter to the SIM card 1.

It should be mentioned here as well that it is also quite possible to combine the functions described, i.e. the programmed means described, of the SIM card 1 and the chip card 2 in such a way as to obtain a universal card capable of carrying out all described functions and services. Preferably, the size of the chip card 2, and also of the universal card described, is that of a credit card, which also corresponds to the full-size format of a SIM card. Smaller chip cards having the plug-in format of a SIM card (about 25×10 mm) are difficult to remove from a mobile device 3, so that chip cards of that size would not be practical to handle, above all upon insertion in peripherals for transactions or other data transmissions. The chip card 2 or the aforementioned universal card may, as stated above, be a value card which, as such, may be sold to customers by suitable service providers or supplied for a limited duration for a periodic or one-time fee.

It must be emphasized here once more, however, that the fields of application of the present invention are almost limitless and are not just suitable for and confined to the examples of monetary transactions mentioned here, but that data of any kind may be loaded on a chip card 2 from a service center 6 over a mobile device 3 operated by a user. Further examples of applications comprise the most varied user programs which may be loaded on the chip card 2 and run, or security profiles and admission authorizations for services and/or buildings, and much more. It should also be mentioned here in particular that the application programs transmitted as data may also be Java applets and that the chip card used in this connection may be a Java-compatible card.

What is claimed is:

1. Method of loading data on a chip card comprising:

receiving, by a SIM card, said data from a service center over a mobile network, wherein said SIM card identifies subscribers in the mobile network, when said SIM card is inserted in a mobile radio telephone and is connected thereto via an interface with contacts;

storing, by said SIM card, the received said data in said SIM card; and transmitting, from said SIM card, the stored said data to said chip card, via a contactless interface, without using said mobile network.

2. Method according to claim 1, wherein said transmitting of said stored data to said chip card takes place by means of an inductive interface integrated in said mobile radio telephone.

3. Method according to claim 2, wherein data is transmitted contactlessly to said mobile radio telephone through said chip card.

4. Method according to claim 1 wherein said transmitting of said stored data from said SIM card to said chip card takes place by means of an inductive interface integrated in said SIM card.

5. Method according to claim 4, wherein data is transmitted contactlessly to said SIM card through said chip card.

6. Method according to claim 1, wherein said transmitting of said data from said service center to said SIM card is initiated by a user by means of input means of said mobile radio telephone and/or by said service center.

7. Method according to claim 1, wherein said transmitting of said stored data from said SIM card to said chip card is initiated by a user by means of input means of said mobile radio telephone.

8. Method according to claim 1, wherein said chip card is a value card, and said data correspond to a sum of money.

9. Method according to claim 1, wherein the transmitting data between said service center and said SIM card is authenticated.

10. Method according to claim 1, wherein the transmitting data between said SIM card and said chip card is authenticated.

11. Method according to claim 1, wherein said mobile network is a GSM network.

12. System for loading data on a chip card comprising a mobile network configured to interface with a service center and a mobile radio telephone, a SIM card that identifies subscribers in the mobile network, the SIM card being insertable into the mobile radio telephone and being connectable thereto via an interface with contacts, and a chip card configured to interface with said SIM card, wherein said SIM card is configured to receive said data transmitted from the service center via said mobile network and store said data upon said receiving, wherein the SIM card further comprises programmed means configured to transmit said stored data to said chip card, via a contactless interface, without using said mobile network, and said chip card further comprises at least one contactless interface and programmed means configured to receive said stored data transmitted from the SIM card via said contactless interface and store said data.

13. System according to claim 12, wherein said chip card further comprises programmed means configured to transmit data to said SIM card via said contactless interface, and wherein the SIM card further comprises programmed means configured to receive data from said chip card via said contactless interface.

14. System according to claim 12, wherein said chip card further comprises programmed means configured to transmit data via said contactless interface to a peripheral and/or configured to receive and store data from the peripheral via said contactless interface.

15. System according to claim 12, wherein said chip card further comprises contacts and programmed means configured to transmit data to a peripheral via an interface with contacts and/or configured to receive and store data from the peripheral via this interface with contacts.

16. System according to claim 12, wherein at least certain of said data are program applications, and wherein the chip card further comprises programmed means configured to install these said program applications.

17. System according to claim 12, wherein said contactless interface is an inductive interface.

18. System according to claim 12, wherein the chip card and the SIM card comprise programmed means configured to enable a secured and authenticated transmission of data between said chip card and said SIM card.

19. System according to claim 12, wherein a contactless interface is integrated into said mobile radio telephone.

20. System according to claim 12, wherein the SIM card further comprises programmed means configured to carry out functions of the chip card.

21. System for loading data on a chip card comprising a mobile network configured to interface with a service center and a mobile radio telephone, a SIM card that identifies subscribers in the mobile network, the SIM card being insertable into the mobile radio telephone and being connectable thereto via an interface with contacts, and a chip card configured to interface with said SIM card, wherein said SIM card in configured to receive said data transmitted from the service center via said mobile network and store said data upon said receiving, the SIM card further comprises programmed means configured to transmit said stored data to said chip card, via a contactless interface, without using said mobile network, said chip card further comprises at least one contactless interface and programmed means configured to receive said stored data transmitted from the SIM card via said contactless interface and store said data, and a contactless interface is integrated into the SIM card.

* * * * *